United States Patent
Cagnacci et al.

(10) Patent No.: US 10,929,253 B2
(45) Date of Patent: Feb. 23, 2021

(54) SYSTEMS AND METHODS FOR SAFETY ANALYSIS INCLUDING CONSIDERATION OF DEPENDENT FAILURES

(71) Applicant: Intel Corporation, Santa Clara, CA (US)

(72) Inventors: Riccardo Cagnacci, Leghorn (IT); Riccardo Mariani, Pisa (IT)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 16/145,347

(22) Filed: Sep. 28, 2018

(65) Prior Publication Data

US 2019/0050300 A1    Feb. 14, 2019

(51) Int. Cl.
  *G06F 11/16*    (2006.01)
  *G06F 11/07*    (2006.01)
  *G06F 17/11*    (2006.01)
  *G06F 11/00*    (2006.01)

(52) U.S. Cl.
  CPC ........ *G06F 11/1629* (2013.01); *G06F 11/004* (2013.01); *G06F 11/0796* (2013.01); *G06F 11/1641* (2013.01); *G06F 17/11* (2013.01); *G06F 11/079* (2013.01)

(58) Field of Classification Search
  CPC .............. G06F 11/004; G06F 11/0796; G06F 11/1641; G06F 11/1629; G06F 17/11
  See application file for complete search history.

(56) References Cited

U.S. PATENT DOCUMENTS

| | | | |
|---|---|---|---|
| 2005/0210331 A1* | 9/2005 | Connelly | G06F 11/0709 714/26 |
| 2006/0156215 A1* | 7/2006 | Kapur | G06F 11/26 714/818 |
| 2007/0220381 A1* | 9/2007 | Huang | G01R 31/3177 714/724 |
| 2012/0066657 A1* | 3/2012 | Bernstein | G06F 30/30 716/112 |
| 2014/0223233 A1* | 8/2014 | Heyrman | G06F 11/202 714/23 |
| 2018/0329371 A1* | 11/2018 | Lin | G06F 1/08 |
| 2018/0336067 A1* | 11/2018 | Lee | G06F 9/505 |
| 2019/0278677 A1* | 9/2019 | Terechko | G06F 11/2242 |
| 2019/0303260 A1* | 10/2019 | Ozer | G06F 11/2236 |

* cited by examiner

*Primary Examiner* — Matthew M Kim
*Assistant Examiner* — Matthew N Putaraksa
(74) *Attorney, Agent, or Firm* — Viering, Jentschura & Partner MBB (57) ABSTRACT

A method for performing safety analysis includes determination of diagnostic coverage of safety mechanisms. The method includes considering the estimation of failure rapture for different scenario and potential sources of failure. The method includes considering and quantifying the effect of dependent failures that arise from other errors that may be already accounted for by existing safety mechanisms.

14 Claims, 7 Drawing Sheets

| [302] IP | [304] %FMEDA: 100.00% DF1 FMEDA Description | [306] FM covered by LCLS | [308] Detailed initiator failure | [310] LCLS active | [312] LambdaDF (permanent) | [314] LambdaDF (transient) | [316] P (permanent) | [318] P (transient) | [320] End effect |
|---|---|---|---|---|---|---|---|---|---|
| CPU | CPU_IIE_10: Incorrect Instruction Execution: [Incorrect Floating point operation caused by floating point logic] | X | Random errors on floating point interface logic will lead to CPU stall when the High ASIL application is executing | Y | 1.23E-01 | 7.89E-01 | 0.800% | 0.400% | - 1) performance degradation in the High ASIL functionalities leading to timing comparison LCLS issues<br>- 2) exceptions caused by FPU data errors leading to potential OS stalls and LCLS timing comparison issues |

| [322] Type | [324] NDF (permanent) | [326] NDF (transient) | [328] Safety mechanisms provided for (A)voidance or (C)ontrol (already included in FMEDA) | [330] FMEDA_SM_DFA _DC (permanent) | [332] FMEDA_SM_D FA_DC (transient) | [334] Safety mechanisms provided for (A)voidance or (C)ontrol or (C) (new from this analysis) | [336] NEW_SM_DFA_D C (permanent) | [338] NEW_SM_DFA _DC (transient) | [340] Priority (permanent) | [342] Priority (transient) |
|---|---|---|---|---|---|---|---|---|---|---|
| CAS | 60.00% | 99.00% | (C) To control the performance degradation an independent timer/watchdog has to protect any safety critical task [for 1) ] | 90% | 90% | (A) Exception handler able to react to FPU exceptions, to not affect LCLS timing functionality [for 2) ] | 60% | 60% | 0.034% | 0.000% |

| | 402 | 404 | 406 | 408 | 410 | 412 |
|---|---|---|---|---|---|---|
| | IP | IP_FMEDA | LCLS | FMEDA LCLS Perm DC | FMEDA LCLS Trans DC | LambdaRF-LCLS contrib (permanent) |
| CPU | CPU_FMEDA10 | | Y | 70% | 75% | 0.012345 |

| | | 416 | 418 | 420 |
|---|---|---|---|---|
| | | New LCLS SM | Perm DC% | Trans DC% |
| | SM_LCLS_CPU_FMEDA10 | | 71.0000% | 76.0000% |
| 414 LambdaRF-LCLS contrib (transient) 0.012345 | | | | |

SYSTEMS AND METHODS FOR SAFETY ANALYSIS INCLUDING CONSIDERATION OF DEPENDENT FAILURES

TECHNICAL FIELD

The present disclosure relates to techniques for executing functional safety analysis.

BACKGROUND

In the context of safety-critical systems, it is required by safety standards (e.g., ISO26262, IEC61508) to execute specific safety analyses to ensure to a tolerable level of the system residual failure rate. The aforesaid standards (for example, ISO 26262) present various possible techniques for predicting failure rates and obtaining the diagnostic values of coverage for electrical components.

In failure analysis, evaluating dependent failures is of significance. In the analysis of dependent failures, including common cause failures and cascading failures, it can be important in order to evaluate the effect on the system when considering sources or scenarios leading to different failures, in particular, concerning FMEDA (Failure Modes, Effects, and Diagnostics Analysis).

Dependent failure analysis focuses on failures that affect both hardware (HW) and software (SW) and are associated with specific failure modes and the related safety mechanisms aimed to detect those failure modes faults. The dependent failure analysis as proposed by the standards is a qualitative analysis, so it is not possible, in this way, to quantify the impact of dependent failures on the diagnostic coverages of safety mechanisms present in the FMEDA.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

SUMMARY

According to one or more exemplary embodiments of the present disclosure, a method for performing functional safety analysis on a system with multiple processing units, wherein the system includes a comparator to compare data from a first core with data from a second core, may include obtaining or accessing, by one or more computing devices, description information regarding the system; determining, by the one or more computing devices, one or more failure modes (FMs) of the system from the description information; determining, by the one or more computing devices, one or more dependent failure initiators (DFIs) from the FMs; determining, by the one or more computing devices, a portion (<SM>_ideal_DC) of the one or more DFIs covered by core comparison without consideration of dependent failures; determining, by the one or more computing devices, a portion (p) of the one or more DFIs that can potentially lead to dependent failure; determining, by the one or more computing devices, a portion (NDF) of the one or more DFIs that cannot lead to dependent failure; determining, by the one or more computing devices, from the portion of the one or more DFIs that can lead to dependent failure, the coverage (K) provided by safety mechanisms other than core comparison; and determining, by the one or more computing devices, a diagnostic coverage (DC) of DFIs provided by core comparison and other safety mechanisms.

According to one or more exemplary embodiments of the present disclosure, a method for performing functional safety analysis on a system with multiple processing units, wherein the system includes a comparator to compare data from a first core with data from a second core, may include obtaining or accessing, by one or more computing devices, description information regarding the system; determining, by the one or more computing devices, an amount of core data ($D_{comp}$) compared within a process safety time (PST) or a fault tolerant time (FTTI); determining, by the one or more computing devices, a total amount of core data ($D_{out}$) compared within the process safety time (PST) or the fault tolerant time (FTTI); determining, by the one or more computing devices, a ratio of $D_{comp}$ to $D_{out}$; determining, by the one or more computing devices, a throughput ($T_{comp}$) of the system; determining, by the one or more computing devices, an amount of data ($T_{out}$) produced in the PST or the FTTI; determining, by the one or more computing devices, a ratio of $T_{out}$ to $T_{comp}$; determining, by the one or more computing devices, a probability (p), that non compared data may interfere with another core; determining, by the one or more computing devices, a probability (k), that the data that may interfere is detected by other safety mechanisms; and determining, by the one or more computing devices, an estimate of software (SW) diagnostic coverage $DC_{comp}$.

DESCRIPTION

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

Various embodiments of the present disclosure are directed toward methods and systems for executing functional safety analysis that include quantification of dependent failure analysis.

Various embodiments of the present disclosure, including exemplary functional operations described in this disclosure, can be implemented in digital electronic circuitry, in tangibly-embodied computer software or firmware, in computer hardware, including the structures disclosed in this specification and their structural equivalents, or in combinations of one or more of them. That is, various embodiments of the present disclosure may be implemented as one or more computer programs, i.e., one or more modules of computer program instructions encoded on a tangible-non transitory computer readable medium for execution by, or to control the operation of, data processing apparatus.

A computer program (which may also be referred to or described as a program, software, a software application, a module, a software module, a script, or code) can be written in any form of programming language, including compiled or interpreted languages, or declarative or procedural languages, and it can be deployed in any way, including as a stand-alone program or as a module, component, subroutine, or another unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across various locations and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer may also be operatively configured coupled to receive data from or transfer data to, or both, one or more mass storage devices for storing data, e.g., magnetic, magneto-optical disks, or optical disks. However, a computer need not have such devices. Moreover, a computer can be embedded in another suitable device, e.g., a smart-phone, a tablet device, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by computer programs running on the respective computers and having a client-server relationship to each other.

Also, various program programs, instructions, code, or functionality described herein been identified based upon an application or software component within which it is implemented in a specific embodiment of the invention. However, it should be appreciated that any particular program nomenclature is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers (e.g., operating systems, libraries, APIs, applications, applets, etc.), it should be appreciated that the invention is not limited to the specific organization and allocation of program functionality described herein.

In general, any computer instructions, program, or software may be stored on any suitable non-transitory computer-readable storage media.

Thus, the disclosure in its broader aspects is not limited to the specific details representative apparatus and method, and illustrative examples shown and described.

Dependent failure analysis as proposed by standards (e.g., ISO 26262) is a qualitative analysis, so it is not possible, in this way, to quantify the impact of dependent failures on the diagnostic coverages of safety mechanisms present in FMEDA. This problem regarding dependent failures impacts safety mechanisms that are claiming diagnostic coverage because of a redundant implementation. In safety mechanisms involving redundant implementation, the diagnostic coverage is presented as typically high or very high but is likely to be affected and not consider dependent failures.

One example of a device or system implementing redundancy is a system with multi-processing elements, where the software (SW) is implemented in a redundant way, so implementing a Loosely Coupled Lock Step (LCLS). However, many different parameters contribute to the definition or determination of the diagnostic coverage for a system implementing LCLS.

Figure 1:
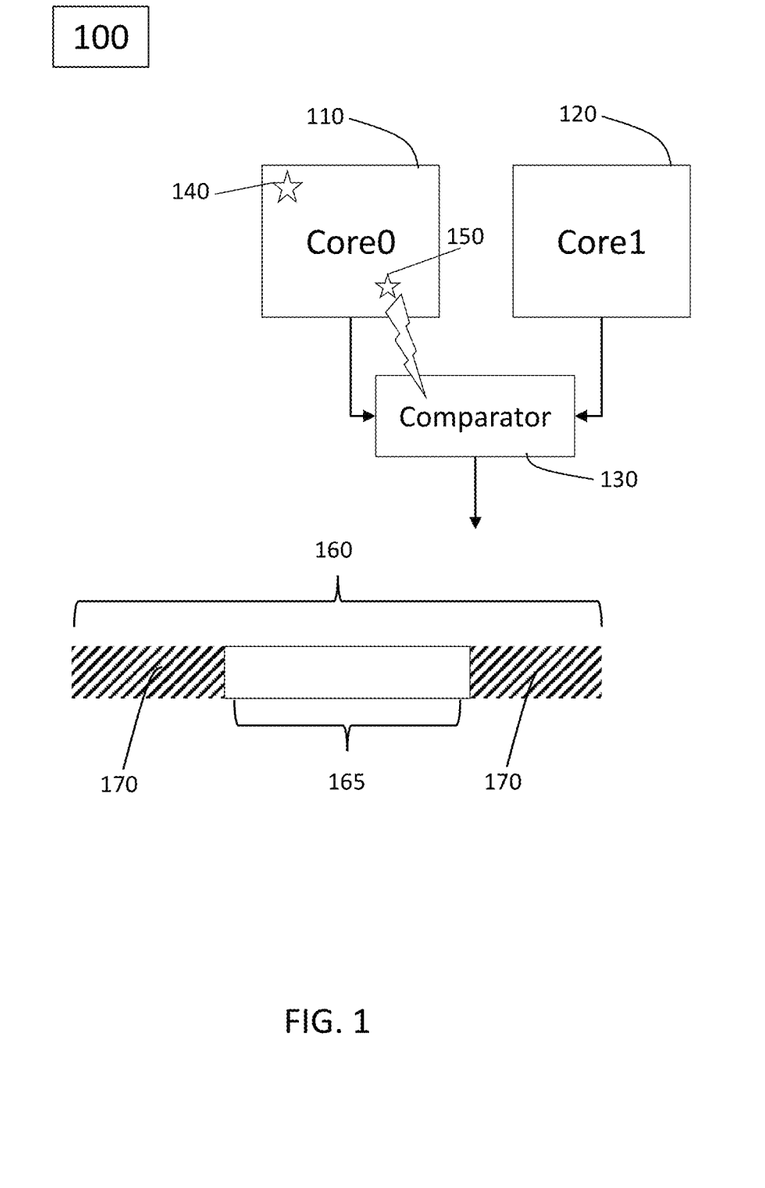
FIG. 1 shows an exemplary processing system with multiple processing units according to some aspects of the present disclosure.

FIG. 1 shows an exemplary processing system 100 including a pair of processing modules 110, 120. The system includes multiple processing units or processing modules which may be independent CPUs, or "cores." In various exemplary embodiments of the present disclosure, the system 100 may run or execute one or more applications or programs. The example of FIG. 1 is an embodiment that includes two cores, but this not necessarily so as other amount or number of cores may be implemented in a processing system.

The system 100 may include a comparator 130 operatively connected to each of the cores, 110 and 120. The comparator may be implemented as another processing unit that is configured to, among other things, to compare that data, information, or messages associated with or coming from each of the cores 110, 120.

In exemplary embodiments of the present disclosure, the cores 110 and 120 may execute, or be configured to implement the same application. For example, a particular fault or failure mode (FM) may be known or associated with the application being executed on one of the cores. This FM or fault may be known to appear or occur at with a specific failure rate, $\lambda_{SR}$. For example, a particular failure mode (e.g., FM1) may produce a wrong core output.

Accordingly, in the example of FIG. 1, the system 100 includes the comparator 130 to run a comparison between the two core. Thus, the comparator unit 130 may then, as a safety mechanism (SM) detect the failure, and initiate an action or countermeasure to remedy or correct or handle such error. In FIG. 1, for example, a fault 140 may occur on core 110. The comparator 130 may determine a fault, failure, or error with a comparison of core output from core 110 with core output from core 120, and then initiate an appropriate or suitable countermeasure, for example starting the sequence for leading the system into a safe state. In various embodiments, the diagnostic coverage or a measure of a system's ability to detect failures may be calculated to be 99% based on FMEDA.

DC determined by FMEDA does not consider dependent faults or errors. That is, there is no quantification of the diagnosis of dependent errors in FMEDA. That is while a particular fault or defect associated with a failure mode may be known or detectable and considered in FMEDA, but a dependent fault or cascading or arising the initial fault may not be part of the analysis.

In the example of FIG. 1, the bar 160 may visually represent the failure rate of a particular failure mode. However, the diagnostic coverage provided by safety mechanism, e.g., diagnostic coverage provided by the comparator 130, may be more limited than the diagnostic coverage FMEDA may indicate. As shown, the area 165 of bar 160 may represent the portion of failure mode accounted for by a safety mechanism (e.g., comparator 130). The other areas 170 may represent the occurrence of failure not covered or accounted for by existing safety mechanisms due to, for example, dependent failures not detected.

Referring back to the example of FIG. 1, the fault 150 may lead to one or more cascading or dependent failures. Failure or fault 150 may be considered as a dependent failure initiator (DFI). These dependent failures arising due to fault 150 may be of such nature that the comparator does not detect error 150. For example, the fault 150 may cause error(s) with the comparator 130 with the comparator not detecting error 150 and not initiating or deploying any countermeasures. In other words, the dependent or cascading failures may mask or hide the existence of error 150. A typical FMEDA does not consider the presence of such dependent failures which in turn decrease the actual or effective diagnostic coverage (DC).

In one example, error 150 could be a failure in the HW or SW logic handling data to be stored in the memory which could affect in the same way the data generated by two CPUs. This can lead to wrong data without fault detection (both data are wrong but equal).

Figure 2:
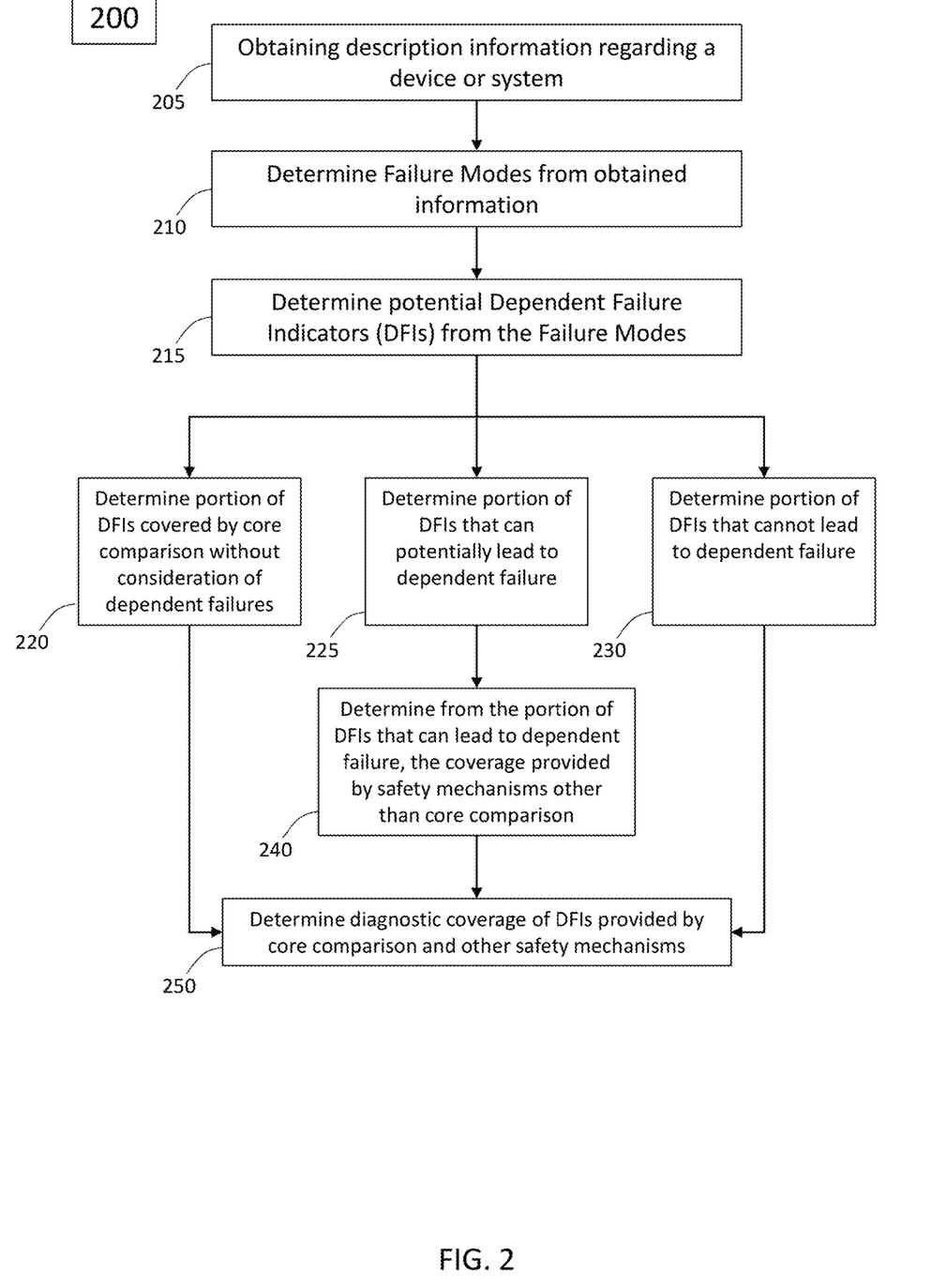
FIG. 2 shows an an exemplary method for functional safety analysis according to some aspects of the present disclosure.

FIG. 2 shows, according to an exemplary embodiment of the present disclosure, an electronic method for functional safety analysis. The method can be implemented by one or more processing, devices. For example, the one or more processing devices may execute program instructions, stored on non-transitory media to perform the method.

First, at 205, the method includes obtaining description information for a device/system e.g., a system with multiple processing units. For example, the method may involve improving on FMEDA with a DFA (dependent failure analysis) that better and quantitatively accounts for dependent failures.

For the exemplary method of FIG. 2, one or more processing devices may obtain description information regarding a device or system. For example, the description information may be netlist data.

The one or more processing devices may obtain the device or system description information from any suitable source through any suitable means, e.g., wired, internet, wireless, etc. For example, the information or data may be obtained from a storage device, e.g., a local database or remote database.

At 210, the method includes obtaining or identifying failure mode(s) from obtained description information. That is, for example, after obtaining the device or system description information, the one or more processing devices can determine the one or more failure modes associated with the device/system. The one or more processing devices can analyze the description information to determine or identify failure modes of the electrical component, system or device.

Further, at 215, the method includes determining the failure modes which are dependent failure initiators (DFIs). For example, the one or more processing devices may extract, determine or selectively identify the failure modes (FMs) that are DFIs from the description information of the system/device.

At 220, the method includes determining the portion of DFIs covered by safety mechanisms of the device/system, without consideration of dependent failures caused by the DFIs. That is, one or more processing devices may determine the fraction (<SM>_ideal_DC) or percentage of DFIs that are covered by existing safety mechanism of the device/system through analysis of the description information. The value or percentage <SM>_ideal_DC can be determined from the obtained description information.

As noted, safety mechanisms, such as in the case of a multi-core or multi-processing unit electrical component/system/device, may include comparisons, e.g., a core comparison as shown in the example of FIG. 1.

At 225, the method includes determining the portion of DFIs that can potentially lead to a dependent failure. That is, the one or more processing devices may determine the fraction or percentage (p) of DFIs that can lead to a potential dependent failure. That is, p is the failure mode distribution (Probability) of the DFI. It is computed considering undetected failure rate of dependent failures (LambdaDF) on the sum of all LambdaDF. This percentage p can also be determined (e.g., by the one or more processing devices) using or analyzing the obtained description information.

At 230, the method includes determining the portion of DFIs that cannot lead to dependent failure. That is, NDF, or Not Dependent Failure is the probability that the DFI can lead or not to DF. It indicates that the logic (e.g. portion of hardware) included in "P" can lead with a certain probability to a dependent failure. For example, this percentage or value may be based on the amount of hardware (HW) logic that is not leading to a DF.

Again, the one or more processing devices may determine this value from the description information. For example, the one or more processing devices may analyze the description information to determine this percentage.

At 240, the method includes determining coverage of the portion of DFIs that can lead to dependent failure and can be covered by safety mechanisms other than a comparison safety mechanism or redundancy safety mechanism (K).

In general, a comparison, e.g., core comparison covers the portion of logic (e.g., HW or software portion) that is not affected by DFI leading to an invalidation of the comparison itself. Accordingly, comparison is not effective against DFI, which is desirous to analyze.

K is the estimated coverage of the safety mechanism mitigating the dependent failure. In case of multiple SMs, (with each K associated with each particular safety mechanism (SM_1, SM_2, etc. —none comparison or redundancy safety mechanism), the total K=1−(1−K_1)*(1−K_2)* . . . *(1−K_n). In other words, determine the coverage provided by other safety mechanisms or countermeasures of DFIs that can lead to dependent failure. For example, this determination may be accomplished by one or more processing devices.

For example, referring back to FIG. 1, core comparison by comparator 130 may be one safety mechanism assigned to mitigate or cover one or more failure modes. However, the device of FIG. 1, as well as other devices, may include more or additional safety mechanisms. That is, for the system 100, a DFI (e.g., fault 150) that cannot be covered by a core comparison or redundancy safety mechanism may be covered another safety mechanism built in the device 100.

At 250, the method includes determining an improved FMEDA diagnostic coverage including coverage of DFIs provided by core comparison and other safety mechanisms. This diagnostic coverage is based on the determined percentage of DFIs that are covered by existing safety mechanism (<SM1>_ideal_DC), the determined percentage of DFIs that can lead to a potential dependent failure (p), the determined percentage of DFIs that cannot lead dependent failure(s) (NDF), and the determined coverage of the portion of DFIs that can lead to dependent failure and can be covered by safety mechanisms other than a comparison safety mechanism or redundancy safety mechanism (K).

For a single DFI, the improved or DFA diagnostic coverage can be expressed as:

$$DC=<SM>\_ideal\_DC*(1-p*(1-NDF)*(1-*K)).$$

Figure 3:
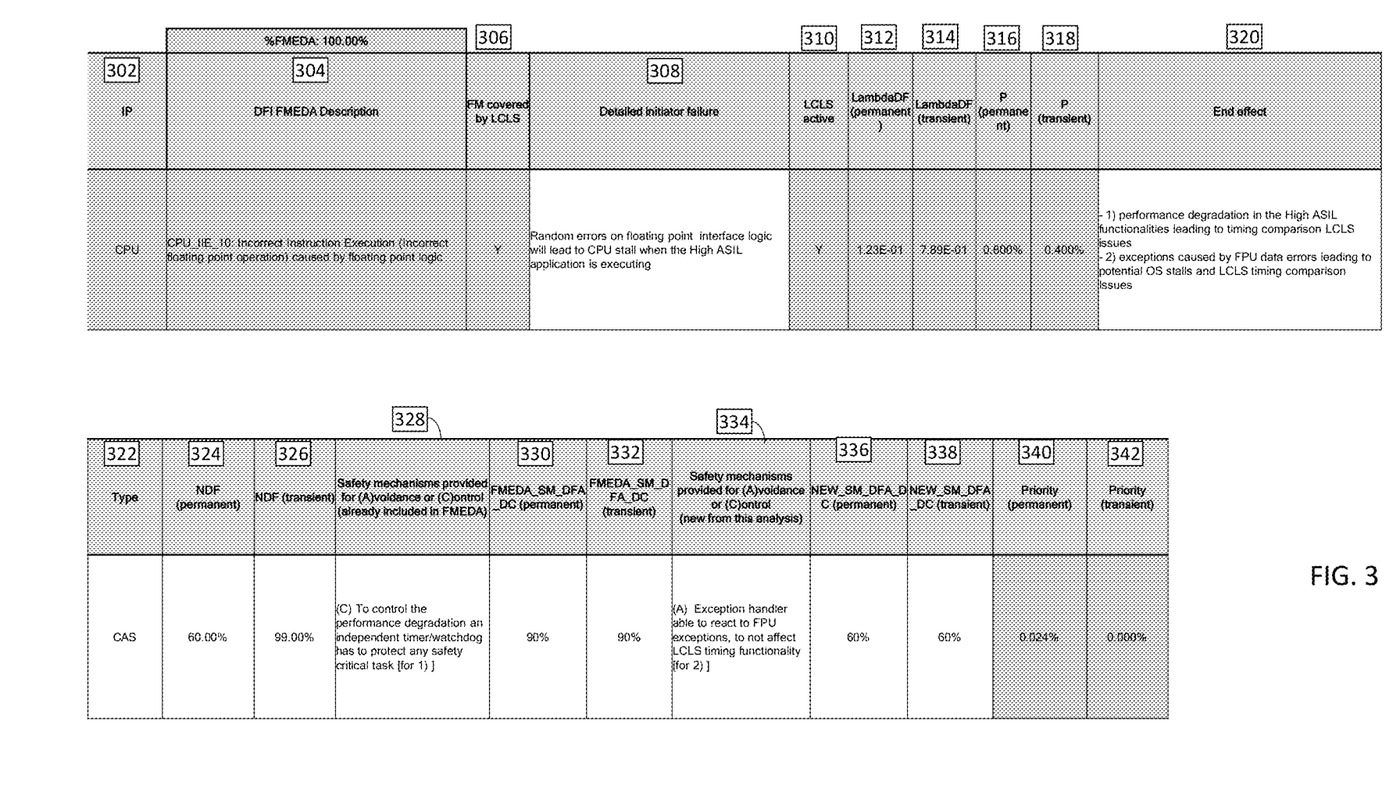
FIGS. 3-4 show an an exemplary executed Dependent Failure Analysis (DFA) and associated results according to some aspects of the present disclosure.

For a plurality of DFIs the diagnostic coverage is:

$$DC=<SM>\_ideal\_DC \times sum_j((1-sum_{ij}(p_{ij} \times (1-k_{ij}) \times (1-NDF_{ij})) \times Scenario_j)$$

where sum_j is the summation from 1 to j of content enclosed in the parentheses i is an index that ranges across all the DFIs (e.g., index for each respective DFI, DFI_i);

j is an index that ranges across all the scenarios (e.g., index for each respective scenario, Scenario_j);

$p_{ij}$ is the fraction of the i-th DFI that may lead to a failure in the j-th scenario;

$k_{ij}$ is the fraction of the i-th DFI that in the j-th scenario may be covered by other safety mechanisms;

$NDF_{ij}$ is the fraction of the i-th DFI that in the j-th scenario may not lead to a dependent failure;

$Scenario_j$ is the j-th scenario, considering failure mode distribution of different use cases (e.g., OS running, middleware running, etc., but it can be extended to any use case)—that is, Scenarios is the percentage of the overall device failure rate associated with the specific Use Case/Scenario In accordance with exemplary embodiments, FIG. 3 shows an exemplary executed Dependent Failure Analysis (DFA) at least with respect to one failure mode. FIG. 3 includes exemplary data that define parameters used in the DFA as well as output or values determined in or for the DFA process. For example, entry item 302 indicates or identifies the core (e.g., Intel Atom®) which is the subject of the DFA.

Entry item 304 indicates a DFI which has been identified from description data, which in this case is an Incorrect Instruction Execution.

Entry item 306 indicates whether core includes a Loosely Coupled Lock Step (LCLS).

Entry item 308 specifies details of the identified dependent failure initiator of 304.

Further, entry item 310 indicates whether the LCLS feature of the core was active for the identified DFI of 304.

Further, more the DFA analysis determines a transient undetected dependent failure rate associated with the failure, shown in 312 and a permanent undetected dependent failure rate associated with the failure mode, shown in 314.

Similarly, items 316 and 318 show respectively the determined permanent and transient (p)—the percentage of DFIs that can potentially lead to dependent failure.

In exemplary embodiments, computation of failure rate may be different if considering the same failure mode but a different fault model (permanent or transient). The calculation, from here, of LambdaDF can also be different. Such data may be based on the description and analysis described before. Depending on the fault model, the effectiveness of a safety mechanisms can be different in terms of diagnostic coverage. For example a periodic check is typically not effective for transient failures.

The method may include indicating, at 320, the effect(s) or possible effect(s) of the dependent failure of 304.

Further, an exemplary DFA may also indicate at entry 322 the type of DFI specified in 304. In this example, the DFI is specified as "CAS."

At 324 and 326 the permanent and the transient NDF (Not Dependent Failure) associated with the corresponding failure mode.

A 328, FIG. 3 shows or indicates the safety mechanisms already accounted for in the FMEDA.

At 330 and 332, the permanent and the transient determined FMEDA diagnostic coverage is respectively shown or indicated.

At 334 the determined safety mechanism for DFA (not part of FMEDA) is shown or indicated.

At 336 and 338 the DFA diagnostic coverage, e.g., the determined DFA diagnostic coverage, (e.g., determined in the method of FIG. 2) is shown for the permanent and transient case.

At 340 and 342, the respective permanent Priority and transient Priority percentage are expressed. Priority percentage can be informative data, e.g., a ranking provided which is useful to understand where to concentrate the analysis in order to achieve a possible diagnostic coverage target.

Figure 4:
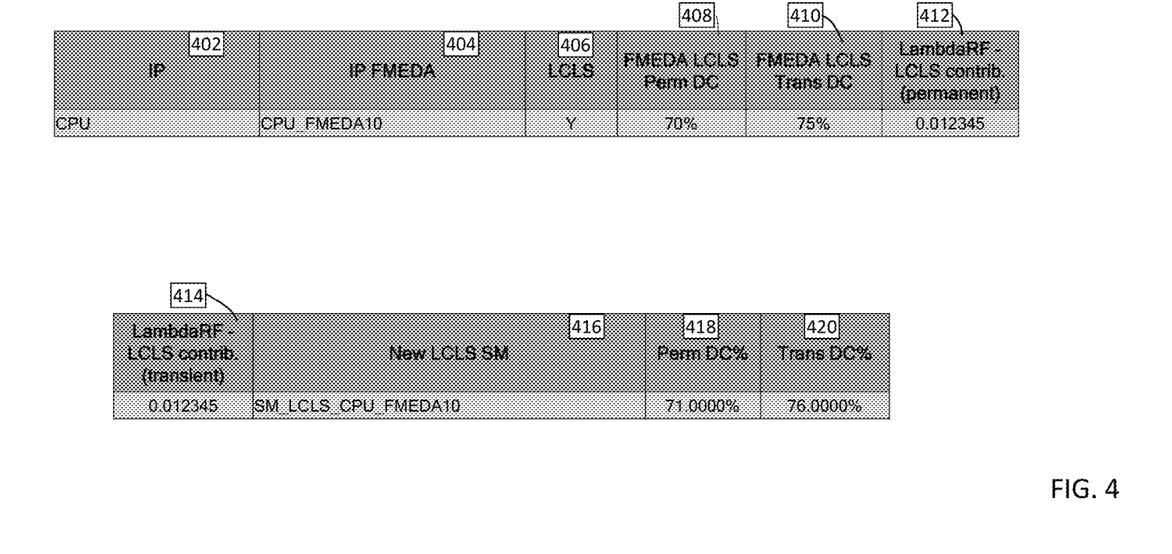

FIG. 4 further, like FIG. 3, shows an exemplary executed Dependent Failure Analysis (DFA). In comparison to FIG. 3, FIG. 4 is an example of the total results of a DFA analysis, for a single failure mode.

Again, in the example of FIG. 4, under entry 402 the core or IP core is indicated. Entry 404 indicates the specific IP core FMEDA entry Entry under 406 indicates whether the core has or implements LCLS, entry 408 indicates a determined permanent FMEDA diagnostic coverage while entry under 410 indicates a determined transient FMEDA diagnostic coverage.

Further, entries under 412 and 414 respectively show the determined residual failure rate, Lambda_Rf, contribution.

Entry under 416 identifies the LCLS safety mechanism for the core, and entries under 418 and 420 respectively determine the permanent and transient diagnostic coverage. Entry 416 indicates the LCLS entry in the safety mechanisms table and it is based on this analysis (NEW), with respect the one previously considered in a "classic" FMEDA analysis Please note that the categories and values or entry information disclosed in FIGS. 3 and 4 are exemplary.

In Functional Safety standards, the diagnostic coverage of SW comparison is defined as "high" but always linked with disclaimers. The "quality of comparison" is related to the observability of the data, e.g., the amount of data compared both in number and in time.

This is because diagnostic coverage is related to the capability of a safety mechanism to detect faults within the fault handling time interval (in ISO 26262, related to fault tolerant time interval (FTTI), or process safety time in IEC 61508).

However, if a fault is not observable at the point of comparison, in general, it cannot be defined as detected, but just "potentially detected." A fault being not observed within the period of observation (remaining "hidden" or "silent") may cause either a failure during the period in which the fault is not compared or may accumulate with other similar faults and cause the same failure in both channels.

Referring back to the example of FIG. 1, a fault in Core 0, 110 being not observed during the period of comparison may cause cascading failures affecting the data of core 1, 120. For example, a fault may affect the configuration of the memory controller or the communication channel, so affecting the transmission of core 1 data to the comparator. Further, such a fault may affect shared resources (e.g., change the configuration of power or clock settings), so affecting the generation of Core 1 data.

In another example, a fault in Core 0, 110 may remain silent for a particular time and then become observable only when another fault has already occurred in the same function in Core 1, 120. As a result, this causes the comparator not to detect the failure. In various implementations, this is not so unlikely because aging effects or voltage/temperature effects (single fault scenario) may cause similar failures in both cores.

Figure 5:
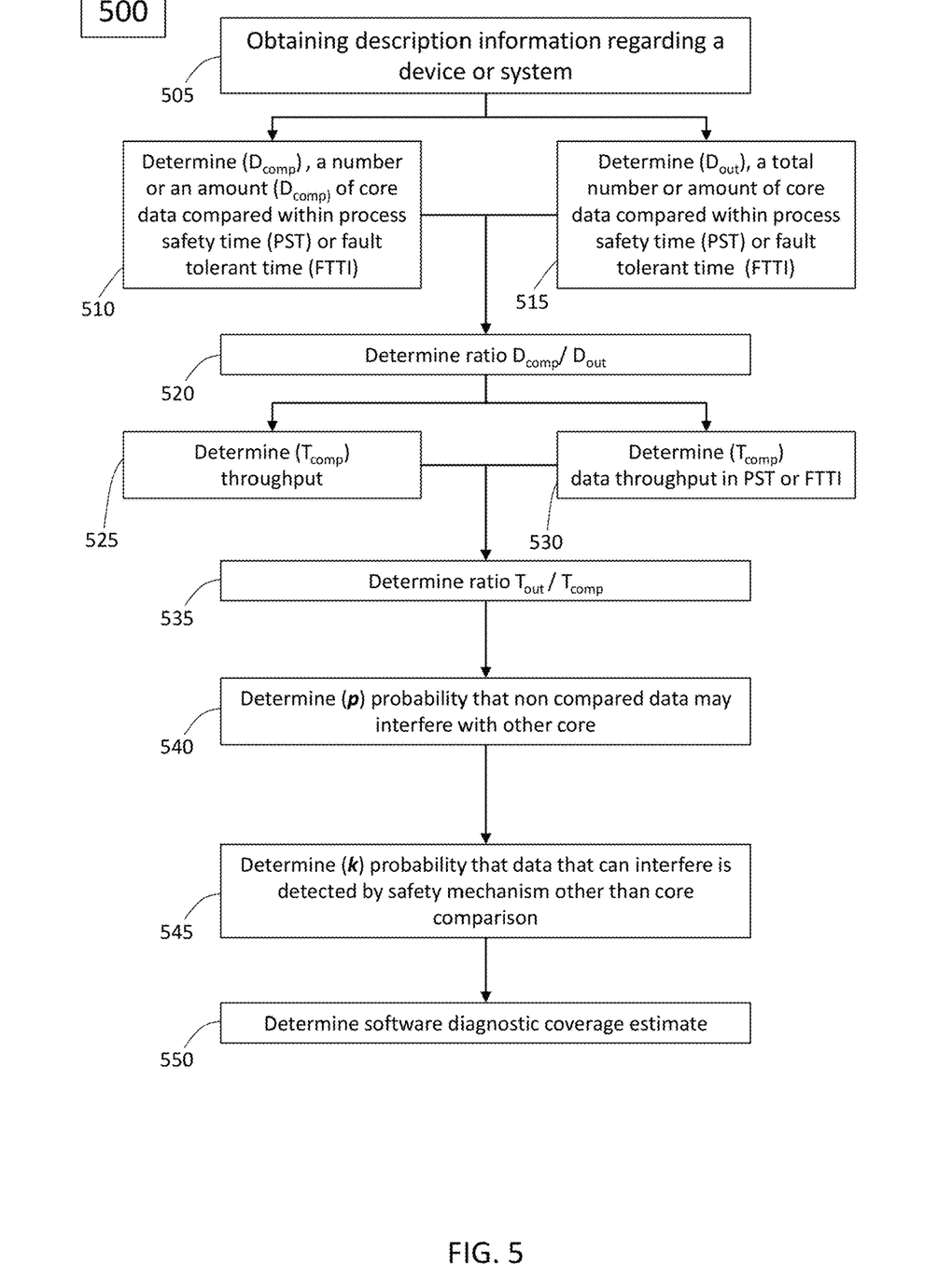
FIG. 5 shows an exemplary method for improved or enhanced determination or estimation of software diagnostic coverage of a device/system.

As a result, an improved diagnostic coverage of a software comparison may be warranted. FIG. 5, shows, according to an exemplary embodiment, an electronic method for improved or enhanced determination or estimation of software diagnostic coverage of a device/system with a loosely coupled lock step (LCLS).

The method can be implemented by one or more processing devices. For example, the one or more processing devices may execute program instructions, stored on non-transitory media, to perform the method.

First, at 505, the method includes obtaining description information for a device/system. The device/system, in accordance with exemplary embodiments, may implement a software lock step. For example, the electrical component, e.g., the device or system may resemble or be similar to device 100 in the example of FIG. 1. After obtaining, accessing, or retrieving the device/system description information, various parameter mays be determined, identified or calculated.

At 510, the method includes determining, a number or an amount of core data $D_{comp}$ compared within process safety time (PST) or fault tolerant time (FTTI).

At 515, the method includes determining, a total number or amount of core data $D_{out}$ compared within process safety time (PST) or fault tolerant time (FTTI).

At 520, the method includes determining a ratio of $D_{comp}$ to $D_{out}$. For example, in various examples, $D_{out}$ can be the total number of output variables for each SW module and $D_{comp}$ can be the total number of variables exposed for comparison.

At 525, the method includes determining $T_{comp}$, a throughput of a core or system, e.g., the frequency at which data is sent out for comparison. This is a value indicating how much data is compared in a PST or FTTI.

At 530, the method includes determining $T_{out}$, which is a value indicating how much data is produced in a PST or FTTI.

At 535, the method includes determining a ratio of $T_{out}$ to $T_{comp}$. For example, this ratio can indicate how often the output variables are generated with respect to how often the variables are compared.

At 540, the method includes determining the probability p, that non-compared data (e.g., data not sent or provided for core comparisoni) may interfere with the other core.

At 545, the method includes determining the probability k, that output data (e.g., core output data) that can interfere is detected by other safety mechanisms.

At 550, the method includes determining the software (SW) diagnostic coverage $DC_{comp}$. The $DC_{comp}$ may be calculated as follows:

$$DC_{comp} = \frac{D_{comp}}{D_{out}} \times \frac{T_{out}}{T_{comp}} +$$

$$\left(1 - \frac{D_{comp}}{D_{out}} \times \frac{T_{out}}{T_{comp}}\right) \times (1-p) + \left(1 - \frac{D_{comp}}{D_{out}} \times \frac{T_{out}}{T_{comp}}\right) \times p \times k$$

$$DC_{comp} = \frac{D_{comp}}{D_{out}} \times \frac{T_{out}}{T_{comp}} + \left(1 - \frac{D_{comp}}{D_{out}} \times \frac{T_{out}}{T_{comp}}\right) \times (1-p) +$$

$$\left(1 - \frac{D_{comp}}{D_{out}} \times \frac{T_{out}}{T_{comp}}\right) \times p \times k$$

Below is an exemplary comparison of an SW DC in comparison to an HW DC. For example, in an exemplary device with HW lock step which compares all data in all clock cycles (for baseline comparison) the following exemplary calculations or determinations are:

$D_{comp}/D_{out}=1; T_{out}/T_{comp}=1$ $DC_{comp}=100\%$

By comparison, another exemplary device may include SW lock step that generates 1000 data each FTTI with a throughput of 1 data each 0.001 ms and comparing 1 data each 0.1 ms. The determined p or probability that non-compared data of the device can generate interference can be exemplary 50%, and k or the probability of that those data are detected by the existing safety mechanisms may be 60%. According to an exemplary implementation of the method of FIG. 5 (e.g., by one or more processing devices) the values and diagnostic coverage are as follows:

$D_{comp}/D_{tot}=1/1000=0.001, T_{out}/T_{comp}=0.001/0.1=0.01, p=0.5, k=0.6$ $DC_{comp}=80\%$.

In another example, the device implementing SW lock step may generate 1000 data each FTTI with a throughput of 1 data each 0.001 ms and comparing 1 data each 0.1 ms; the but only 10% of non-compared data can generate interference, and there are no safety mechanisms to detect those interferences. Then according to an exemplary implementation of the method of FIG. 5, the following determination or calculations may be made:

$$D_{comp}/D_{tot}=1/1000=0.001, T_{out}/T_{comp}=0.001/0.1=0.01, p=0.5, k=0$$

$$DC_{comp}=90\%$$

In another example, the device implementing SW lock step may generate 1000 data each FTTI with a throughput of 1 data each 0.001 ms and comparing a data CRC computed on 100 data accumulated each 0.001 ms. Further, only 10% of non-compared data can generate interference, and 90% of those data are detected by the existing safety mechanisms. According to an exemplary implementation based on FIG. 5, the following calculations or determinations can be made:

$$D_{comp}/D_{tot}=1/1000=0.001, T_{out}/T_{comp}=0.001/0.1=0.01, p=0.5, k=0$$

$$DC_{comp}=90\%$$

Figure 6:
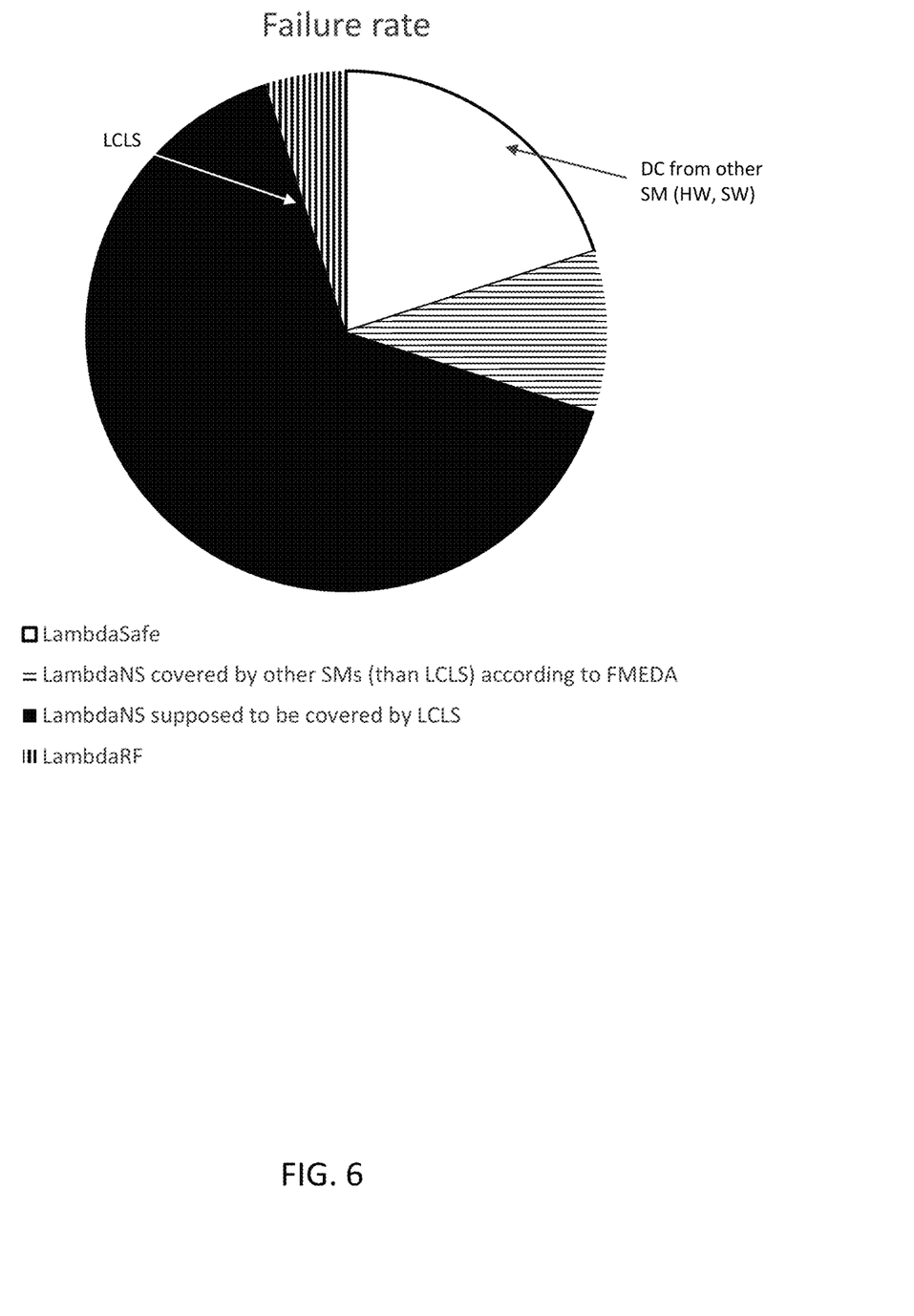
FIGS. 6-7 show exemplary diagnostic coverage results.
Figure 7:
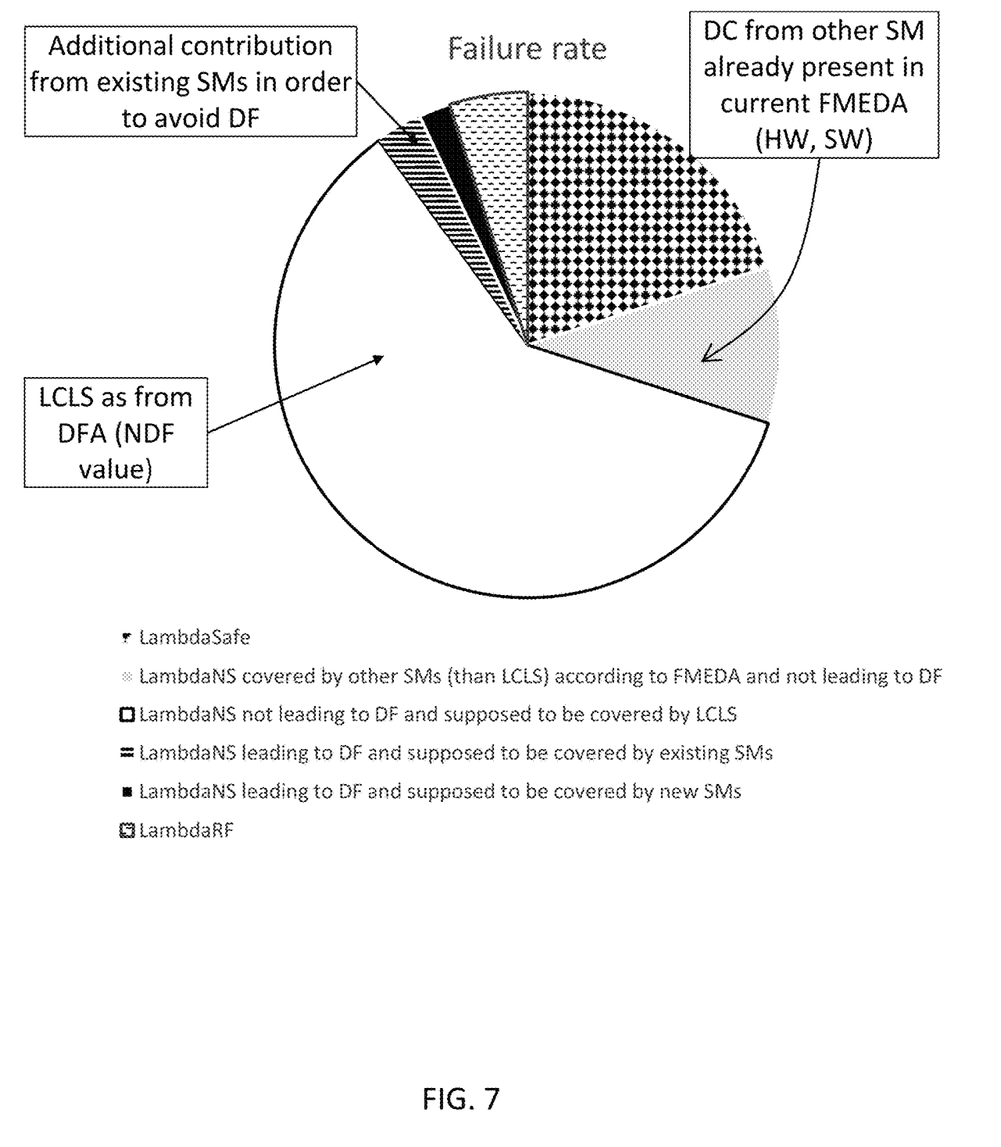

In accordance with exemplary embodiments described herein, IP FMEDAs that impact LCLS are considered. For example, IP FMEDAs may include or be a source of: List of failure modes (FMs) that LCLS is supposed to cover (potential DFIs), failure rates. Further, in accordance with exemplary embodiments, and electronic methods to implement DFA for LCLS described herein include:
- Identifying portion(s) of the potential dependent failure initiators (DFIs) that will not lead to dependent failure (DF)
- Identifying DFIs leading to an impact on the LCLS comparisons. (This is done considering different scenarios)
- Evaluating additional safety mechanisms (SMs) to decrease the impact of DF
- Computing the LCLS coverage per IP core or per Hardware portion In addition to identifying dependent failures that lead to an impact on the LCLS comparisons, in exemplary embodiments, the method may also consider or rely on:
(1) The coverage provided by safety mechanisms already covering the specific FMEDA line or item. (Further, it may be assumed that the portion of hardware (HW) of a device/system covered by these SMs does not lead to DF(s) affecting LCLS.)
(2) The coverage provided by safety mechanisms not yet covering the specific FMEDA line but already present in the overall FMEDA FIG. 6, shows the diagnostic coverage under existing FMEDA approach. The corresponding portions of the overall failure rate are
LambdaSafe
LambdaNS by SM other than LCLS=
LambdaNS covered by LCLS
LambdaRF
LambdaNS is the failure rate portion of the failure mode for which any fault could potentially leads error/failure/safety goal violation.
LamdaRF=residual failure rate FIG. 7, according to exemplary embodiments of the present disclosure, shows the diagnostic coverage under existing FMEDA approach. The corresponding portions of the overall failure rate are
LambdaSafe
LambdaNS by SM other than LCLS
LambdaNS covered by LCLS
LambdaRF The inclusion of the above-identified considerations generally will increase diagnostic coverage (DC) for the specific safety mechanism, (e.g., LCLS). Further, in accordance with exemplary embodiments of the present disclosure, it may be assumed that the LCLS DC would be 100% in case of no dependent failures.

The DC is evaluated, at first, in the case of a comparison done only on the final algorithm results or any way each diagnostic test interval (DTI). For example, the application SW may executing computations, which based on this, results are provided. It can be represented by an algorithm.

That is, in the method, there may be no intermediate checks, and there may be no consideration of assumptions on the amount of data exchanged (key parameters, Dcomp, Dout, Tout, Tcomp). Sensitivity analysis considering of the parameters may be done at the end. Sensitivity analysis may be the evaluation of the impact on the analysis when considering different values of Dcomp/Dout, Tcomp/Tout.

Thus, in embodiments, in accordance with exemplary embodiments of the present disclosure, the method may be implemented by reducing the formula by assuming:

$$D_{comp}/D_{out}=0; \text{ and } T_{out}/T_{comp}\rightarrow 0):$$

Then the formula:

$$DC_{comp}=D_{comp}/D_{out}\times T_{out}/T_{comp}+(1-D_{comp}/D_{out}\times T_{out}/T_{comp})\times(1-p_{int})+(1-D_{comp}/D_{out}\times T_{out}/T_{comp})\times p_{int}\times k_{int}$$

May be reduced to:

$$DC_{comp}\times 1-p_{int}\times(1-k_{int})$$

where $p_{int}$=probability that a non compared data may interfere with the other core
and $k_{int}$ probability that a data that can interfere is detected by other safety mechanisms.
int=intermediate Further, for considering different scenarios, different default initiators (DFIs) and an ideal LCLS DC:

$$DC=LCLS\_ideal\_DC\times sum\_j((1-sum\_i\_j(p\_i\_j\times(1-k\_i\_j)\times(1-NDF\_i\_j))\times Scenario\_j)$$

IP and scenarios to be considered are based on a specific application model (e.g., IP: Atom®, System Agent®, Dunit®. For example, various scenarios may be High ASIL (automo[1]tive safety integrity level), Low ASIL tasks, OS, MW (middleware), etc.

[1] ASILB is a value of the Automotive Safety Integrity Level

For example, in the context of ISO 26262, during High ASIL only high ASIL tasks are running (ASIL >=ASILB). Here LCLS it is supposed to be executed. Low ASIL=execution of low ASIL tasks (ASIL <ASILB)
OS=only the OS is running
MW=only the middleware is running All acronyms defined in the above description additionally hold in all claims included herein.

The following examples pertain to further aspects of this disclosure:

Example 1 is a method for performing functional safety analysis on a system with multiple processing units, wherein the system includes a comparator to compare data from a first core with data from a second core, the method including obtaining or accessing, by one or more computing devices, description information regarding the system; determining, by the one or more computing devices, one or more failure modes (FMs) of the system from the description information; determining, by the one or more computing devices, one or more dependent failure initiators (DFIs) from the FMs; determining, by the one or more computing devices, a portion (<SM>_ideal_DC) of the one or more DFIs covered by core comparison without consideration of dependent failures; determining, by the one or more computing devices, a portion (p) of the one or more DFIs that can potentially lead to dependent failure; determining, by the one or more computing devices, a portion (NDF) of the one or more DFIs that cannot lead to dependent failure; determining, by the one or more computing devices, from the portion of the one or more DFIs that can lead to dependent failure, the coverage (K) provided by safety mechanisms other than core comparison; and determining, by the one or more computing devices, a diagnostic coverage (DC) of DFIs provided by core comparison and other safety mechanisms.

In Example 2, the subject matter of Example 1, wherein the obtained description information can optionally indicate the system includes a single DFI and wherein the diagnostic coverage DC for the system is determined by the one or more processing devices according to the formula:

$$DC=<SM>\_ideal\_DC*(1-p*(1-NDF)*(1-*K)).$$

In Example 3, the subject matter of Example 1, wherein the obtained description information can optionally indicate the system includes a plurality of safety mechanisms (SM_1, SM_2, etc.) other than core comparison, wherein the coverage K may be determined by the one or more processing devices according to the formula $$K=1-(1-K\_1)*(1-K\_2)* \ldots *(1-K\_n)$$

wherein K_n is the coverage associated with SM_n.

In Example 4, the subject matter of Example 1, wherein the obtained description information can optionally indicate the system includes a plurality of DFIs and wherein the diagnostic coverage DC for the system is can be optionally determined by the one or more processing devices according to the formula:

$$DC=<SM>\_ideal\_DC \times sum\_j((1-sum\_i\_j(p\_i\_j \times (1-k\_i\_j) \times NDF\_i\_j)) \times Scenario\_j)$$

where
i is an index that ranges across all the DFIs;
j is an index that ranges across all the scenarios;
$p_{ij}$ is the fraction of the i-th DFI that may lead to a failure in the j-th scenario;
$k_{ij}$ is the fraction of the i-th DFI that in the j-th scenario may be covered by other safety mechanisms;
$NDF_{ij}$ is the fraction of the i-th DFI that in the j-th scenario may not lead to a dependent failure;
Scenario_j is the j-th scenario, considering failure mode distribution of different use cases.

Example 5 is a method for performing functional safety analysis on a system with multiple processing units, wherein the system includes a comparator to compare data from a first core with data from a second core, the method can include obtaining or accessing, by one or more computing devices, description information regarding the system; determining, by the one or more computing devices, an amount of core data ($D_{comp}$) compared within a process safety time (PST) or a fault tolerant time (FTTI); determining, by the one or more computing devices, a total amount of core data ($D_{out}$) compared within the process safety time (PST) or the fault tolerant time (FTTI); determining, by the one or more computing devices, a ratio of $D_{comp}$ to $D_{out}$; determining, by the one or more computing devices, a throughput ($T_{comp}$) of the device; determining, by the one or more computing devices, an amount of data ($T_{out}$) produced in the PST or the FTTI; determining, by the one or more computing devices, a ratio of $T_{out}$ to $T_{comp}$; determining, by the one or more computing devices, a probability (p), that non compared data may interfere with another core; determining, by the one or more computing devices, a probability (k), that the data that may interfere is detected by other safety mechanisms; and determining, by the one or more computing devices, an estimate of software (SW) diagnostic coverage $DC_{comp}$.

In Example 6, the subject matter of Example 5, wherein the estimate of the $DC_{comp}$ is calculated by the one or more computers according to the formula:

$$DC_{comp} = \frac{D_{comp}}{D_{out}} \times \frac{T_{out}}{T_{comp}} + \left(1 - \frac{D_{comp}}{D_{out}} \times \frac{T_{out}}{T_{comp}}\right) \times (1-p) + \left(1 - \frac{D_{comp}}{D_{out}} \times \frac{T_{out}}{T_{comp}}\right) \times p \times k$$

In Example 7, the subject matter of Example 5, wherein the obtained information indicates the system includes a plurality of software modules, and wherein $D_{out}$ is a total number of output variables for each SW module and $D_{comp}$ is a total number of variables exposed for comparison.

In Example 8, the subject matter of Example 5, wherein the ratio of $T_{out}$ to $T_{comp}$ indicates a rate at which output variables are generated with respect to how often the variables are compared.

Example 9 is a computer program product including a non-transitory computer-readable storage medium having program instructions stored thereon that when executed by at least processor, cause the at least one processor to perform a method of functional safety analysis of a system with multiple processing units, the system including a comparator to compare data from a first core with data from a second core, wherein instructions can cause the at least one processor to obtain or access description information regarding the system; determine one or more failure modes (FMs) of the system from the description information; determine one or more dependent failure initiators (DFIs) from the FMs; determine a portion (<SM>_ideal_DC) of the one or more DFIs covered by core comparison without consideration of dependent failures; determine a portion (p) of the one or more DFIs that can potentially lead to dependent failure; determine a portion (NDF) of the one or more DFIs that cannot lead to dependent failure; determine from the portion of the one or more DFIs that can lead to dependent failure, the coverage (K) provided by safety mechanisms other than core comparison; and determine a diagnostic coverage (DC) of DFIs provided by core comparison and other safety mechanisms.

In Example 10, the subject matter of Example 9, wherein the obtained description information can optionally indicate the system includes a single DFI and wherein the diagnostic coverage DC for the system is determined by the one or more processing devices according to the formula:

$$DC=<SM>\_ideal\_DC*(1-p*(1-NDF)*(1-*K)).$$

In Example 11, the subject matter of Example 9, wherein the obtained description information can optionally indicate the system includes a plurality of safety mechanisms (SM_1, SM_2, etc.) other than core comparison, wherein the coverage K may be determined by the one or more processing devices according to the formula $$K=1-(1-K\_1)*(1-K\_2)* \ldots *(1-K\_n)$$

wherein K_n is the coverage associated with SM_n.

In Example 12, the subject matter of Example 9, wherein the obtained description information can optionally indicate the system includes a plurality of DFIs and wherein the diagnostic coverage DC for the system is can be optionally determined by the one or more processing devices according to the formula:

$$DC=\langle SM\rangle\_ideal\_DC \times sum\_j((1-sum\_i\_j(p\_i\_j\times(1-k\_i\_j)\times(1-NDF\_j))\times Scenario\_j)$$

where i is an index that ranges across all the DFIs;
j is an index that ranges across all the scenarios;
$p_{ij}$ is the fraction of the i-th DFI that may lead to a failure in the j-th scenario;
$k_{ij}$ is the fraction of the i-th DFI that in the j-th scenario may be covered by other safety mechanisms;
$NDF_{ij}$ is the fraction of the i-th DFI that in the j-th scenario may not lead to a dependent failure;
Scenario_j is the j-th scenario, considering failure mode distribution of different use cases.

Example 13 is a computer program product including a non-transitory computer-readable storage medium having program instructions stored thereon that when executed by at least processor, cause the at least one processor to perform a method of functional safety analysis of a system with multiple processing units, the system including a comparator to compare data from a first core with data from a second core, wherein instructions can cause the at least one processor to obtain or access description information regarding the system; determine an amount of core data ($D_{comp}$) compared within a process safety time (PST) or a fault tolerant time (FTTI); determine a total amount of core data ($D_{out}$) compared within the process safety time (PST) or the fault tolerant time (FTTI); determine a ratio of $D_{comp}$ to $D_{out}$; determine a throughput ($T_{comp}$) of the system; determine an amount of data ($T_{out}$) produced in the PST or the FTTI; determine a ratio of $T_{out}$ to $T_{comp}$; determine a probability (p), that non compared data may interfere with another core; determine a probability (k), that the data that may interfere is detected by other safety mechanisms; and determine an estimate of software (SW) diagnostic coverage $DC_{comp}$.

In Example 14, the subject matter of Example 13, wherein the estimate of the $DC_{comp}$ can be calculated according to the formula:

$$DC_{comp} = \frac{D_{comp}}{D_{out}} \times \frac{T_{out}}{T_{comp}} + \left(1 - \frac{D_{comp}}{D_{out}} \times \frac{T_{out}}{T_{comp}}\right) \times (1-p) + \left(1 - \frac{D_{comp}}{D_{out}} \times \frac{T_{out}}{T_{comp}}\right) \times p \times k$$

In Example 15, the subject matter of Example 13, wherein the obtained information can optionally indicate the system includes a plurality of software modules, and wherein $D_{out}$ is a total number of output variables for each SW module and $D_{comp}$ is a total number of variables exposed for comparison.

In Example 16, the subject matter of Example 13, wherein the ratio of $T_{out}$ to $T_{comp}$ can optionally indicate a rate at which output variables are generated with respect to how often the variables are compared.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes which come within the meaning and range of equivalency of the claims are therefore intended to be embraced.

The invention claimed is:

1. A method for performing functional safety analysis on a system with multiple processing units, wherein the system includes a comparator to compare data from a first core with data from a second core, the method comprising:
   obtaining or accessing, by one or more computing devices, description information regarding the system, the description information comprising a netlist of the system;
   determining, by the one or more computing devices, one or more failure modes (FMs) of the system from the description information;
   determining, by the one or more computing devices, one or more dependent failure initiators (DFIs) from the FMs;
   determining, by the one or more computing devices, a portion ($\langle SM\rangle\_ideal\_DC$) of the one or more DFIs covered by core comparison without consideration of dependent failures;
   determining, by the one or more computing devices, a portion (p) of the one or more DFIs that can potentially lead to dependent failure;
   determining, by the one or more computing devices, a portion (NDF) of the one or more DFIs that cannot lead to dependent failure;
   determining, by the one or more computing devices, from the portion of the one or more DFIs that can lead to dependent failure, the coverage (K) provided by safety mechanisms other than core comparison; and
   determining, by the one or more computing devices, a diagnostic coverage (DC) of FMs provided by core comparison and other safety mechanisms,
   wherein the obtained description information indicates the system includes a single DFI and wherein the diagnostic coverage DC for the system is determined by the one or more processing devices according to the formula:

$$DC=\langle SM\rangle\_ideal\_DC*(1-p*(1-NDF)*(1-*K)).$$

2. The method of claim 1, wherein the obtained description information indicates the system includes a plurality of safety mechanisms (SM_1, SM_2, etc.) other than core comparison, wherein the coverage K is determined by the one or more processing devices according to the formula $$K=1-(1-K\_1)*(1-K\_2)* \ldots *(1-K\_n)$$

wherein K_n is the coverage associated with SM_n.

3. The method of claim 1, wherein the obtained description information indicates the system includes a plurality of DFIs and wherein the diagnostic coverage DC for the system is determined by the one or more processing devices according to the formula:

$$DC=\langle SM\rangle\_ideal\_DC \times sum\_j((1-sum\_i\_j(p\_i\_j\times(1-k\_i\_j)\times(1-NDF\_j))\times Scenario\_j)$$

where i is an index that ranges across all the DFIs;
j is an index that ranges across all the scenarios;
$p_{ij}$ is the fraction of the i-th DFI that may lead to a failure in the j-th scenario;
$k_{ij}$ is the fraction of the i-th DFI that in the j-th scenario may be covered by other safety mechanisms;

NDF$_{ij}$ is the fraction of the i-th DFI that in the j-th scenario may not lead to a dependent failure;

Scenario_j is the j-th scenario, considering failure mode distribution of different use cases.

4. A method for performing functional safety analysis on a system with multiple processing units, wherein the system includes a comparator to compare data from a first core with data from a second core, the method comprising:

obtaining or accessing, by one or more computing devices, description information regarding the system, the description information comprising a netlist of the system;

determining, by the one or more computing devices, an amount of core data (D$_{comp}$) compared within a process safety time (PST) or a fault tolerant time (FTTI);

determining, by the one or more computing devices, a total amount of core data (D$_{out}$) compared within the process safety time (PST) or the fault tolerant time (FTTI);

determining, by the one or more computing devices, a ratio of D$_{comp}$ to D$_{out}$;

determining, by the one or more computing devices, a throughput (T$_{comp}$) of the system;

determining, by the one or more computing devices, an amount of data (T$_{out}$) produced in the PST or the FTTI;

determining, by the one or more computing devices, a ratio of T$_{out}$ to T$_{comp}$;

determining, by the one or more computing devices, a probability (p), that non compared data may interfere with another core;

determining, by the one or more computing devices, a probability (k), that the data that may interfere is detected by other safety mechanisms; and determining, by the one or more computing devices, an estimate of software (SW) diagnostic coverage DC$_{comp}$.

5. The method of claim 4, wherein the estimate of the DC$_{comp}$ is calculated by the one or more computers according to the formula:

$$DC_{comp} = \frac{D_{comp}}{D_{out}} \times \frac{T_{out}}{T_{comp}} + \left(1 - \frac{D_{comp}}{D_{out}} \times \frac{T_{out}}{T_{comp}}\right) \times (1-p) + \left(1 - \frac{D_{comp}}{D_{out}} \times \frac{T_{out}}{T_{comp}}\right) \times p \times k$$

6. The method of claim 4, wherein the obtained information indicates the system includes a plurality of software modules, and wherein D$_{out}$ is a total number of output variables data for each SW module and D$_{comp}$ is a total number of variables data exposed for comparison.

7. The method of claim 4, wherein the ratio of T$_{out}$ to T$_{comp}$ indicates a rate at which output variables are generated with respect to how often the variables are compared.

8. A computer program product comprising a non-transitory computer-readable storage medium having program instructions stored thereon that when executed by at least processor, cause the at least one processor to perform a method of functional safety analysis of a system with multiple processing units, the system including a comparator to compare data from a first core with data from a second core, wherein instructions cause the at least one processor to:

obtain or access description information regarding the system, the description information comprising a netlist of the system;

determine one or more failure modes (FMs) of the system from the description information;

determine one or more dependent failure initiators (DFIs) from the FMs;

determine a portion (<SM>_ideal_DC) of the one or more DFIs covered by core comparison without consideration of dependent failures;

determine a portion (p) of the one or more DFIs that can potentially lead to dependent failure;

determine a portion (NDF) of the one or more DFIs that cannot lead to dependent failure;

determine from the portion of the one or more DFIs that can lead to dependent failure, the coverage (K) provided by safety mechanisms other than core comparison; and determine a diagnostic coverage (DC) of DFIs provided by core comparison and other safety mechanisms, wherein the obtained description information indicates the system includes a single DFI and wherein the diagnostic coverage DC for the system is determined according to the formula:

DC=<SM>_ideal_DC*(1−p*(1−NDF)*(1−*K)).

9. The computer program product of claim 8, wherein the obtained description information indicates the system includes a plurality of safety mechanisms (SM_1, SM_2, etc.) other than core comparison, wherein the coverage K is determined according to the formula:

K=1−(1−K_1)*(1−K_2)* ... *(1−K_n)

wherein K_n is the coverage associated with SM_n.

10. The computer program product of claim 1, wherein the obtained description information indicates the system includes a plurality of DFIs and wherein the diagnostic coverage DC for the system is determined according to the formula:

DC=<SM>_ideal_DC×sum_j((1−sum_i_j(p_i_j×(1−k_i_j)×(1−NDF_j))×Scenario_j)

where
   i is an index that ranges across all the DFIs;
   j is an index that ranges across all the scenarios;
   p$_{ij}$ is the fraction of the i-th DFI that may lead to a failure in the j-th scenario;
   k$_{ij}$ is the fraction of the i-th DFI that in the j-th scenario may be covered by other safety mechanisms;
   NDF$_{ij}$ is the fraction of the i-th DFI that in the j-th scenario may not lead to a dependent failure;
   Scenario_j is the j-th scenario, considering failure mode distribution of different use cases.

11. A computer program product comprising a non-transitory computer-readable storage medium having program instructions stored thereon that when executed by at least processor, cause the at least one processor to perform a method of functional safety analysis of a system with multiple processing units, the system including a comparator to compare data from a first core with data from a second core, wherein instructions cause the at least one processor to:

obtain or access description information regarding the system, the description information comprising a netlist of the system;

determine an amount of core data (D$_{comp}$) compared within a process safety time (PST) or a fault tolerant time (FTTI);

determine a total amount of core data (D$_{out}$) compared within the process safety time (PST) or the fault tolerant time (FTTI);

determine a ratio of $D_{comp}$ to $D_{out}$;
determine a throughput ($T_{comp}$) of the system;
determine an amount of data ($T_{out}$) produced in the PST or the FTTI;
determine a ratio of $T_{out}$ to $T_{comp}$;
determine a probability (p), that non compared data may interfere with another core;
determine a probability (k), that the data that may interfere is detected by other safety mechanisms; and
determine an estimate of software (SW) diagnostic coverage $DC_{comp}$.

12. The computer program product of claim 11, wherein the estimate of the $DC_{comp}$ is calculated by the one or more computers according to the formula:

$$DC_{comp} = \frac{D_{comp}}{D_{out}} \times \frac{T_{out}}{T_{comp}} + \left(1 - \frac{D_{comp}}{D_{out}} \times \frac{T_{out}}{T_{comp}}\right) \times (1-p) + \left(1 - \frac{D_{comp}}{D_{out}} \times \frac{T_{out}}{T_{comp}}\right) \times p \times k$$

13. The computer program product of claim 11, wherein the obtained information indicates the system includes a plurality of software modules, and wherein $D_{out}$ is a total number of output variables for each SW module and $D_{comp}$ is a total number of variables exposed for comparison.

14. The computer program product of claim 11, wherein the ratio of $T_{out}$ to $T_{comp}$ indicates a rate at which output variables are generated with respect to how often the variables are compared.

* * * * *